United States Patent
Akiyama et al.

(10) Patent No.: US 7,676,794 B2
(45) Date of Patent: Mar. 9, 2010

(54) TESTING SCENARIOS THAT SEQUENTIALLY EXECUTE A PLURALITY OF APPLICATION PROGRAM INTERFACES

(75) Inventors: Koji Akiyama, Kanagawa (JP); Yohichi Hattori, Yokohama (JP); Akira Iwamoto, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 377 days.

(21) Appl. No.: 11/681,823

(22) Filed: Mar. 5, 2007

(65) Prior Publication Data
US 2008/0040732 A1 Feb. 14, 2008

(30) Foreign Application Priority Data
Mar. 9, 2006 (JP) .............................. 2006-063759

(51) Int. Cl.
G06F 9/44 (2006.01)
G06F 11/00 (2006.01)
G06F 3/00 (2006.01)

(52) U.S. Cl. .................. 717/127; 717/124; 714/38; 719/328

(58) Field of Classification Search ......... 717/124–135; 714/37, 38; 719/328
See application file for complete search history.

(56) References Cited

U.S. PATENT DOCUMENTS

| | | | | |
|---|---|---|---|---|
| 5,701,408 | A * | 12/1997 | Cornell et al. | 714/38 |
| 6,026,238 | A * | 2/2000 | Bond et al. | 717/141 |
| 6,279,124 | B1 * | 8/2001 | Brouwer et al. | 714/38 |
| 7,158,906 | B2 * | 1/2007 | Maruno | 702/108 |
| 7,237,231 | B2 * | 6/2007 | Lambert | 717/127 |
| 7,493,597 | B2 * | 2/2009 | Hefner | 717/124 |
| 7,526,680 | B2 * | 4/2009 | Mathew et al. | 714/37 |

(Continued)

FOREIGN PATENT DOCUMENTS

JP   H07-219810   8/1995

(Continued)

OTHER PUBLICATIONS

Ferguson et al., "The Chaining Approach for Software Test Data Generation," Jan. 1996, ACM, p. 63-86.*

(Continued)

*Primary Examiner*—Wei Y Zhen
*Assistant Examiner*—Qing Chen
(74) *Attorney, Agent, or Firm*—Robert Straight; Shimokaji & Associates, P.C.

(57) ABSTRACT

To efficiently decide input data of an API to be executed and indicate a candidate for an API to be executed, a tool for testing a scenario which sequentially executes a plurality of APIs includes an API test control unit that stores, with the execution of the API, sequence data indicating an execution sequence of the APIs and input and output data in a test information database via an API sequence registering unit. Association data indicating association of input and output data between the APIs is also stored in the test information database via an association registering unit. Responsively, the API test control unit displays a candidate API list indicating one or more candidates for an API to be executed next based on the sequence data, and decides the input data of the API to be executed next based on the association data.

1 Claim, 16 Drawing Sheets

U.S. PATENT DOCUMENTS

| | | | |
|---|---|---|---|
| 2003/0159089 A1* | 8/2003 | DiJoseph | 714/38 |
| 2003/0208351 A1* | 11/2003 | Hartman et al. | 703/22 |
| 2005/0038621 A1* | 2/2005 | Maruno | 702/108 |
| 2006/0190771 A1* | 8/2006 | Hefner | 714/38 |
| 2006/0288256 A1* | 12/2006 | Mathew et al. | 714/38 |
| 2007/0094541 A1* | 4/2007 | Kang | 714/38 |

FOREIGN PATENT DOCUMENTS

| | | |
|---|---|---|
| JP | PUPAH09258975 | 10/1997 |
| JP | H10-154055 | 6/1998 |
| JP | H11-085489 | 3/1999 |
| JP | H11-175329 | 7/1999 |
| JP | H11-353168 | 12/1999 |
| JP | 2000-235485 | 8/2000 |
| JP | PUPA2000215082 | 8/2000 |
| JP | PUPA2000235485 | 8/2000 |
| JP | 2001-236215 | 8/2001 |
| JP | PUPA2001216142 | 8/2001 |
| WO | WO2004061652 | 7/2004 |
| WO | WO2004061652 A1 | 7/2004 |

OTHER PUBLICATIONS

Labiche et al., "Testing Levels for Object-Oriented Software," Jun. 2000, ACM, p. 136-145.*

Alspaugh et al., "Scenarios, State Machines and Purpose-Driven Testing," Jul. 2005, ACM, p. 1-5.*

* cited by examiner

API REGISTRATION TABLE 40

| SCENARIO | SEQUENCE | API-ID | PARAMETER CLASS | PARAMETER ID | PARAMETER |
|---|---|---|---|---|---|
| ACCOUNT OPENING | 1 | 0001 | IN | 001 | 10 |
| | | | IN | 002 | 200 |
| | | | IN | 003 | A |
| | | | OUT | 001 | 50 |
| | | | OUT | 002 | 1 |
| | 2 | 0002 | IN | 001 | 1 |
| | | | OUT | 001 | 5 |
| | 3 | 0003 | IN | 001 | A |
| | | | IN | 002 | 2 |
| | | | OUT | 001 | 100 |
| ... | ... | ... | ... | ... | ... |

FIG. 11

PARAMETER ASSOCIATION TABLE 50

| API-ID | PARAMETER CLASS | PARAMETER ID | ASSOCIATED API-ID | ASSOCIATED PARAMETER CLASS | ASSOCIATED PARAMETER ID |
|---|---|---|---|---|---|
| 0002 | IN | 001 | 0001 | OUT | 002 |
| 0003 | IN | 001 | 0001 | IN | 003 |
| ... | ... | ... | ... | ... | ... |

FIG. 12

ERROR PATTERN TABLE 60

| API-ID | PATTERN | INPUT PARAMETER ID | VALUE |
|---|---|---|---|
| 0001 | R1 | 002 | INPUT2 |
| | | 006 | INPUT6 |
| | ... | ... | ... |
| ... | | | ... |

FIG. 13

```
/***********************************************************
 * SCENARIO NAME:testScenario
 * USED API:
 * 1. getInformation
 * 2. create
 *
 * ASSOCIATION:
 * API2:
 * Input2_1 = Output1_1
 * Input2_3 = Input1_3
 * Input2_5 = Output1_20
 *
 ***********************************************************/ output1 = object1.getInformation(
        Input1_1, Input1_2, Input1_3,
        Input1_4, Iriput1_5, Input1_6,
        Input1_7, Input1_8, Input1_9,
        Input1_10, Input1_11, Input1_12,
        Input1_13, Input1_14, Input1_15
        );

output2 = object2.create(
        output1.getOutput1_1(), Input2_2, Input1_3,
        Input2_4, Output1.getOutput1_20(), Input2_6
        );
```

FIG. 17

TESTING SCENARIOS THAT SEQUENTIALLY EXECUTE A PLURALITY OF APPLICATION PROGRAM INTERFACES

FIELD OF THE INVENTION

The present invention relates to a method, an apparatus, and a program for testing a scenario. More particularly, the present invention relates to a method, an apparatus, and a program for testing a scenario that sequentially executes a plurality of application program interfaces (APIs).

BACKGROUND

Techniques for improving developers' working efficiency in each stage of system development have been proposed. For example, Japanese Published Patent Application No. 2000-235485 discloses a method of reducing the workload by creating a scenario based on a degree of association between a use case and an API in the system designing stage using APIs.

Moreover, in a stage of testing a system, a tool for performing an interactive API test by means of GUI (Graphical User Interface) has been used. According to such a tool, an API is executed by manually inputting the respective input data (parameters) or reading a file in which the input data have been registered beforehand. In addition, input data and output data can be stored in files, and/or comparison of test data can be performed.

However, if the number of input data for an API and the number of digits thereof are large, the input data may be erroneously entered, and correction thereof may take time. In such a situation, no method has been provided to automatically use the input and output data of the executed APIs as the input data of the succeeding APIs even when there are associations of input and output data between a plurality of APIs (e.g., output data of a previous API becomes input data of a succeeding API).

Further, in the test of software which executes a plurality of APIs according to business processing (scenario), it is difficult to appropriately select an API depending on a situation from among a large number of APIs. Although the method described in Japanese Published Patent Application No. 2000-235485 can extract a scenario associated with the API from information on a given use case, no method is provided to indicate a candidate for a succeeding API in generating and testing a new scenario.

SUMMARY

Therefore, an object of the present invention is to provide a method, an apparatus and a program for efficiently deciding input data of an API to be executed, and further indicating a candidate for an API to be executed, on testing a scenario.

According to a first aspect of the present invention, there is provided a method of testing a scenario which sequentially executes a plurality of APIs. This method includes the steps of displaying a list of APIs each of which is a candidate to be executed next, receiving a selection of an API to be executed next from the list of APIs, receiving input data of the selected API, executing the selected API, storing sequence data indicating an execution sequence of the executed APIs, and storing association data indicating associations of input and output data between the executed APIs, wherein one or more candidate APIs are displayed based on the sequence data if the sequence data has already been stored in the step of displaying the list of APIs, and wherein the association data is displayed if the association data has already been stored in the step of receiving the input data of the selected API.

According to another aspect of the present invention, there is provided an apparatus for testing a scenario which sequentially executes a plurality of APIs. This apparatus includes a display unit for displaying a list of APIs each of which is a candidate to be executed next, an API selecting unit for receiving a selection of an API to be executed next from the list of APIs, an input unit for receiving input data of the selected API, an API executing unit for executing the selected API, and a storage unit for storing sequence data indicating an execution sequence of the executed APIs, and association data indicating associations of input and output data between the executed APIs, wherein the display unit displays one or more candidate APIs based on this sequence data if the sequence data has already been stored when it displays the list of APIs, and the display unit displays the association data if the association data has already been stored when the input unit receives the input data of the selected API.

According to a third aspect of the present invention, there is provided a computer program for causing a computer to execute the method of the first aspect.

According to a fourth aspect of the present invention, there is provided a program product wherein the computer program according to the third aspect is recorded on a computer readable medium.

The computer which implements the above-mentioned aspects of the present invention stores the sequence data indicating the execution sequence of the APIs, and the association data indicating the associations of the input and output data of the APIs. The sequence data and association data gradually increase the amount of information thereof by repeating the tests.

By using the sequence data and association data whose amount of information has been increased, on testing the scenario, the computer can efficiently decide the input data of the APIs to be executed, and further, effectively indicate a candidate for an API to be executed According to the present invention, efficiency in the test of a scenario which sequentially executes APIs may be increased, thus allowing quality of developed applications to be improved.

BRIEF DESCRIPTION OF THE DRAWINGS

The invention may be best understood by reference to the detailed description below together with the drawings, in which drawings:

FIG. 11 illustrates an API registration table according to the preferred embodiment;

FIG. 12 illustrates a parameter association table according to the preferred embodiment;

FIG. 13 illustrates an error pattern table according to the preferred embodiment;

FIG. 17 illustrates an example of code generation of the testing means according to the preferred embodiment.

DETAILED DESCRIPTION

Figure 1:
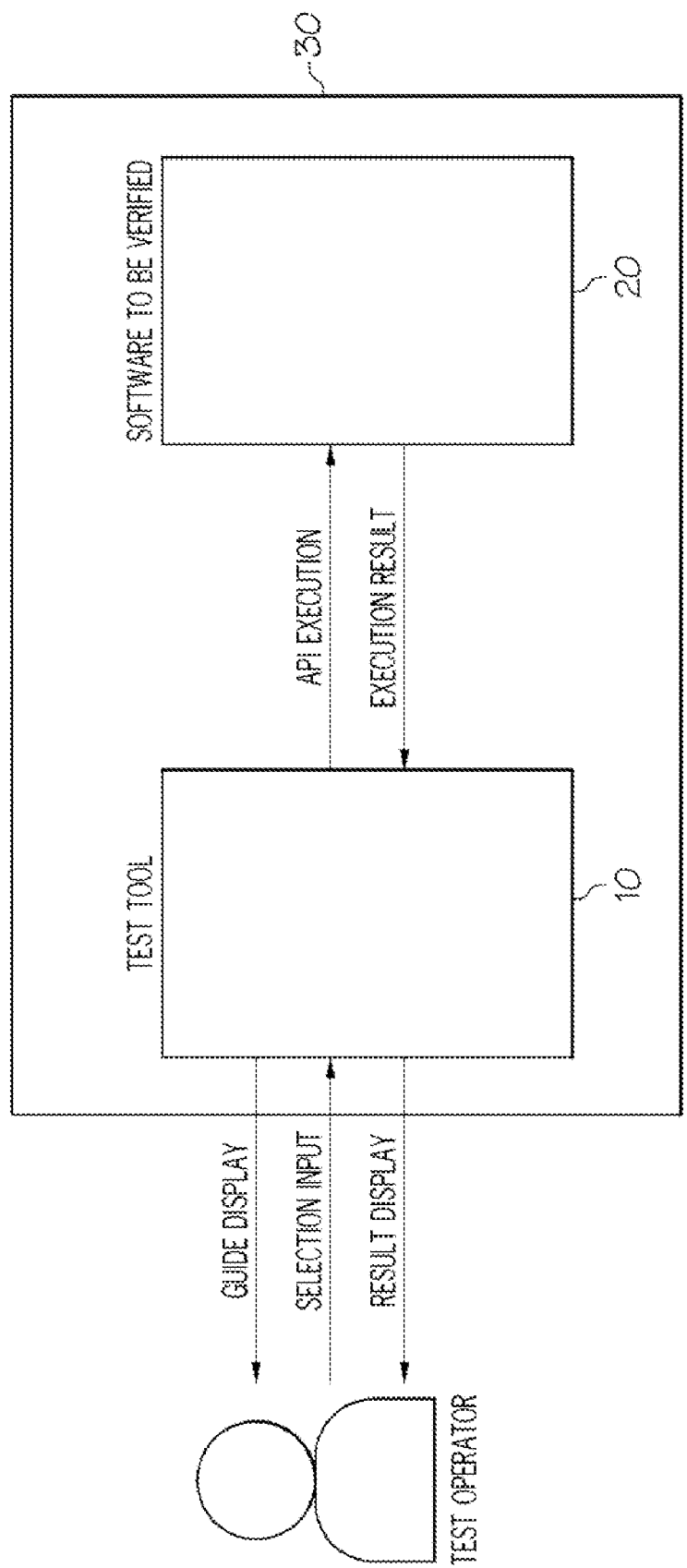
FIG. 1 is an overall conceptual diagram illustrating a preferred embodiment according to the present invention.

FIG. 1 is an overall conceptual diagram illustrating an example of a preferred embodiment according to the present invention When a test operator tests software to be verified 20 which is a combination of APIs, the test operator specifies input data to the APIs according to an assumed scenario and obtains an execution result (output data).

The scenario here is business processing (for example, account opening processing, deposit and withdrawal processing, or the like in the banking business) accomplished by the software to be verified 20, which is constituted by a plurality of APIs with a predetermined execution sequence. An API is a function to receive input data and output a processing result or a program to achieve that function, in order to serve a part of functions related to the business processing. For example, the API may be a procedure, a function, or the like which accomplishes the above-mentioned function, Upon testing, by intervening a test tool 10 according to the present invention, a guidance regarding selection of APIs or designation of input data is displayed so that the test operator can execute the APIs and obtains the result more efficiently compared with manually performing all the selection of the APIs and designation of the input data.

Note that the test tool 10 may be arranged in a computer 30 including the software to be verified 20 or in another computer.

The present invention can be implemented as hardware, software, or a combination of hardware and software. Atypical example of the implementation by the combination of hardware and software may use a computer system having a predetermined program. In this case, the predetermined program is loaded in and executed by the computer system, so that the program causes the computer system to perform the processing according to the present invention This program is constituted by a set of instructions which can be expressed by an arbitrary language, code, or notation. Such an instruction set enables the system to perform a specific function directly or after (1) conversion to a different language, code or notation, and/or (2) reproduction in a different material. Of course, the present invention encompasses not only such a program itself but also a program product including a medium on which the program is recorded.

The program for performing the function of the present invention can be stored in any computer readable medium, such as a flexible disk, an MO, a CD-ROM, a DVD, a hard disk drive, a ROM, an MRAM, and a RAM. In order to store in the computer readable medium, the program can be downloaded from a different computer system connected via a communication line or can be reproduced from a different medium. The program can also be compressed or divided into a plurality of components or modules to store in a single recording medium or multiple recording media.

Figure 2:
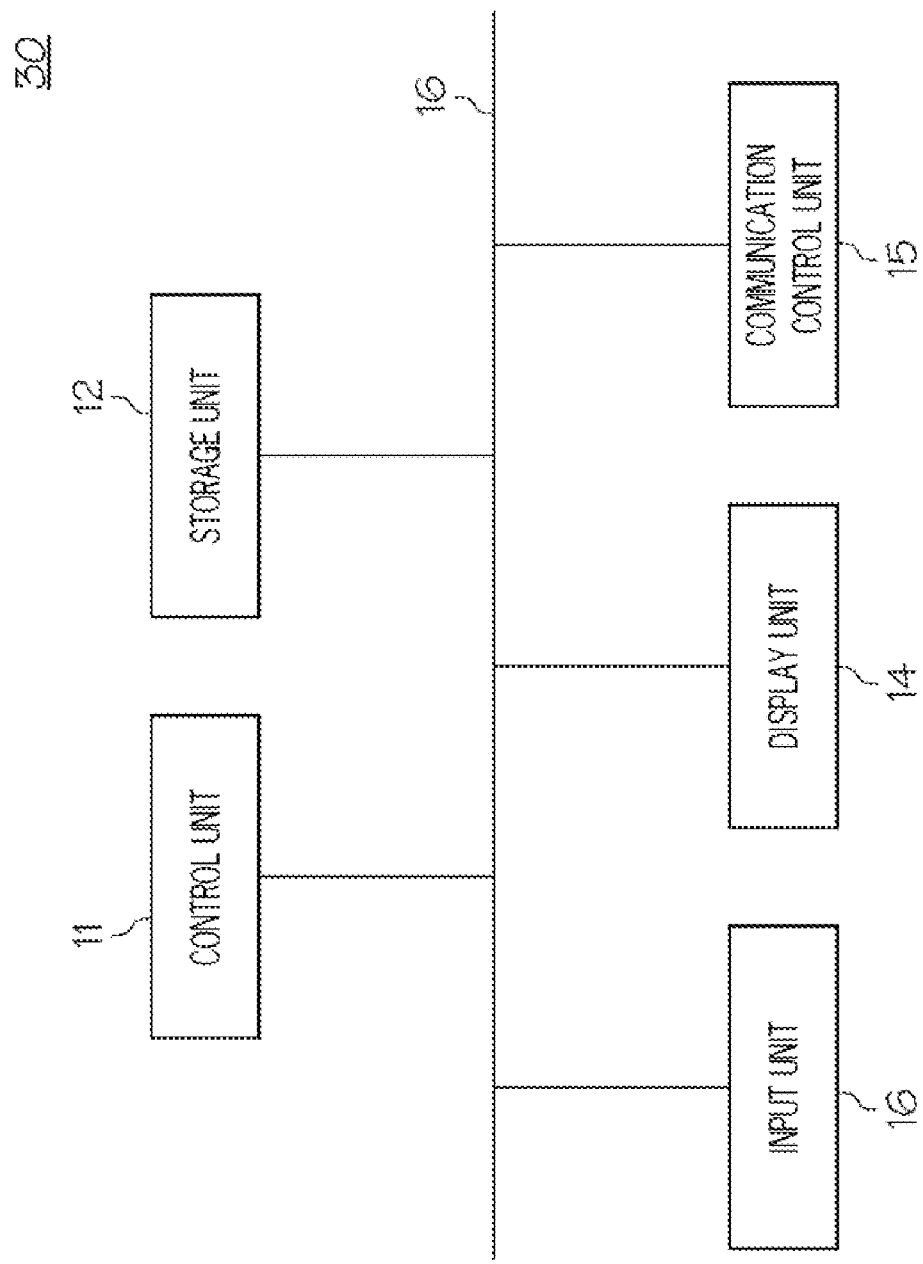
FIG. 2 is a block diagram illustrating a configuration of a computer according to the preferred embodiment.

FIG. 2 is a block diagram illustrating a configuration of the computer 30 according to the preferred embodiment of the present invention.

A control unit 11, a storage unit 52, an input unit 13, a display unit 54, and a communication control unit 15 are connected to each other via a bus 16.

The control unit 11 is a central processing unit (CPU) which performs computation and processing of information, and controls the whole computer. The control unit 11 cooperates with the above-mentioned hardware by appropriately reading and executing various programs stored in the storage unit 12 to achieve various functions according to the present invention The storage unit 12 includes a local memory used for executing the program in conjunction with the control unit 11, a large-capacity bulk storage, and a cache memory used for efficiently searching the bulk storage.

The input unit 13 receives input from a user, which may be a keyboard, a pointing device, or the like. The input unit 13 can be connected with the computer 30 directly or via an intermediate I/O controller.

The display unit 14 displays a screen to the user to receive data input or the result of processing by the computer, which may be a display device, such as a cathode-ray tube display (CRT) or a liquid crystal display (LCD). The display unit 14 can be connected with the computer 30 directly or via the intermediate I/O controller.

The communication control unit 15 is a network adapter for enabling the computer to be connected to a different processing system, a remote printer, or a storage device via a private or public network. The communication control unit 15 may be a modem, a cable modem, an Ethernet® card, or the like.

Figure 3:
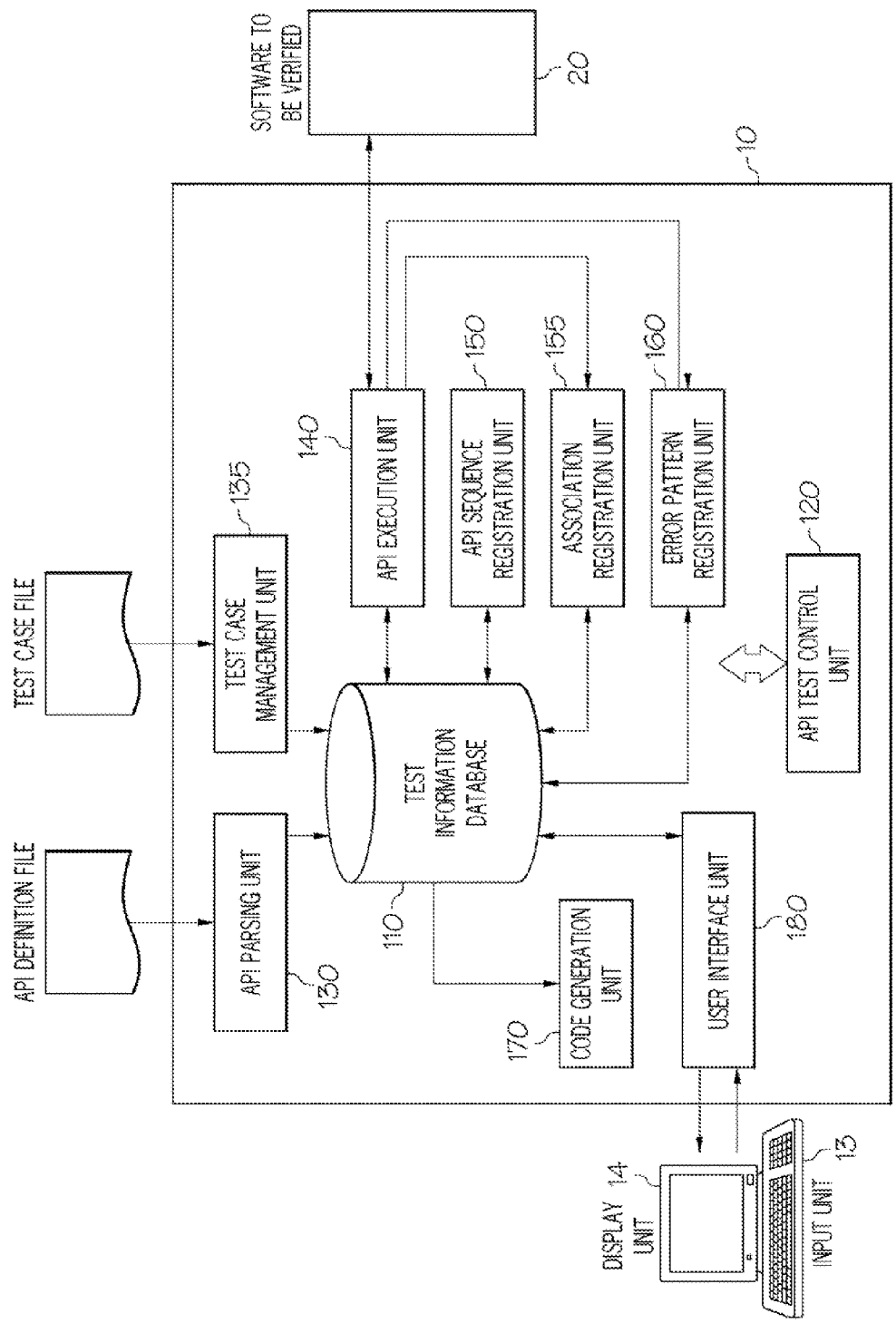
FIG. 3 is a block diagram illustrating an implementation configuration of testing means with which a test tool is provided according to the preferred embodiment.

FIG. 3 is a block diagram illustrating an implementation configuration of testing means which the test tool 10 is provided with according to the preferred embodiment of the present invention.

Various data related to the operation of the test tool 10 is stored in a test information database 110. The test information database 110 is not limited to a specific form, and may be DB2®, various XML databases, or the like. An API test control unit 120 cooperates with each of the units, which will be described later, to control the whole test tool 10, and properly reads/writes the data in the test information database 110.

An API parsing unit 130 reads an API definition file which defines an I/O data format and the like of an API included in the software to be verified, and stores data regarding a call format of the API in the test information database 110. The test operator selects from the APIs defined here and executes an API suitable for the scenario to be tested. The API definition file may be a structured document, such as XML.

A test case management unit 135 reads a test case file which describes the input data, and stores it in the test information database 110, when a test case (test input data) is preliminarily set up. The test case may be preliminarily set up in this manner or may be specified upon executing the APIs. The test case file may be a structured document, such as XML.

An API execution unit 140 calls and executes the APIs included in the software to be verified 20 based on the test case which is read by the test case management unit 135 or the input data which is appropriately specified. The APIs may be an object of JAVA®, and the software to be verified 20 may be on a platform (OS) different from that of the test tool 10. RMI (Remote Method Invocation)/IIOP (Internet Inter-ORB Protocol) (RMI over IIOP) may be used as a call protocol, An API sequence registration unit 150 stores input and output data of the APIs executed in the scenario and sequence data regarding an execution sequence thereof in the test information database 110 (registration processing upon completion, which will be described later)

The input and output data mean here input data (such as input parameters or the like) required when the APIs are executed and output data (such as output parameters, function values, or the like) representing the execution result The sequence data is data representing the execution sequence of the APIs, including, for example, IDs identifying APIs executed in the tested scenario and their sequence, or a list of APIs executed following the execution of a certain API in a given scenario.

An association registration unit 155 extracts mutual associations from the input and output data of the APIs obtained from the API execution unit and stores them in the test information database 110 as association data (registration processing upon completion, which will be described later). Alternatively, the association data may be obtained from the test operator via a user interface unit 180 (registration processing upon execution, which will be described later).

The association data here is data representing the mutual associations of the input and output data, including, for example, data representing such a feature that the input data or the output data of a certain API executed previously is identical with the input data of a succeeding API (the same data as that of the preceding API is inputted as the input data of the succeeding API).

Note herein that, in extracting the association from the input and output data, data representing a rule of association (for example, associating I/O data having the same value with each other, or associating I/O data having the same data field name with each other) is preliminarily stored.

An error pattern registration unit 160 compares the input data used when the execution of the API resulted in an error with the input data used when the execution resulted in no error to determine a combination of input data resulting in the error, and stores it in the test information database 110 as error pattern data (error pattern registration processing, which will be described later).

The error pattern data, here is a combination of input data which may possibly cause an error when an API is executed. For example, a difference between the input data used when the execution of the API resulted in an error and the input data used when the execution was successful is considered as an error factor, and an ID for identifying the input data and a value thereof constitute the error pattern data.

A code generation unit 170 generates a source code of a sample which is usable in an actual application program based on the data stored in the test information database 110 (code generation processing, which will be described later).

A user interface unit 180 receives selection of an API to be executed, input data to the API and association data of 10 data from the test operator via the input unit 13. It also displays result data in various processing described later on the display unit 14. The user interface unit 180 provides an interactive interface via GUI.

Figure 4:
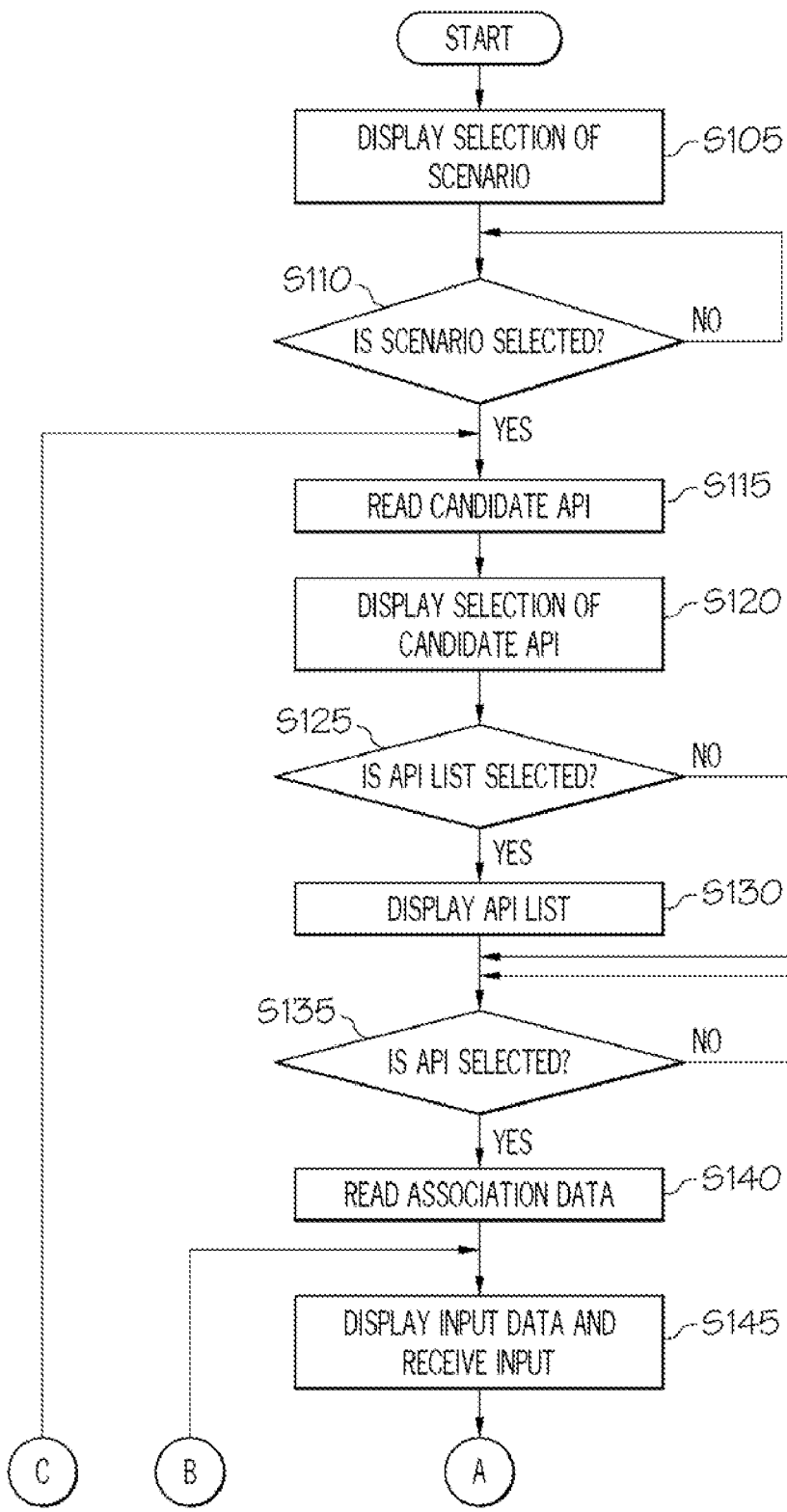
FIG. 4 is a flow chart illustrating main processing of the testing means according to the preferred embodiment.
Figure 5:
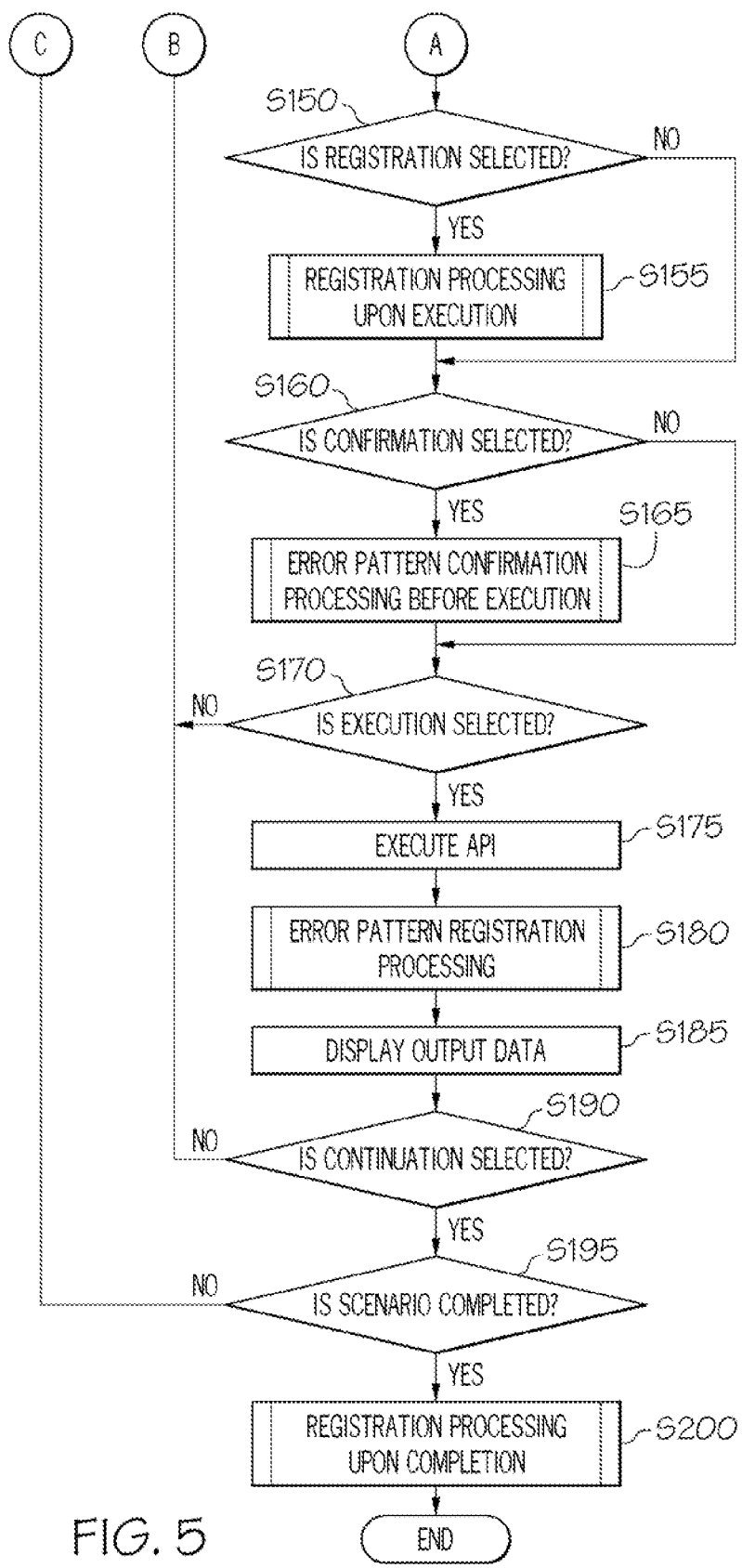
FIG. 5 is a flow chart illustrating the main processing of the testing means according to the preferred embodiment.
Figure 14:
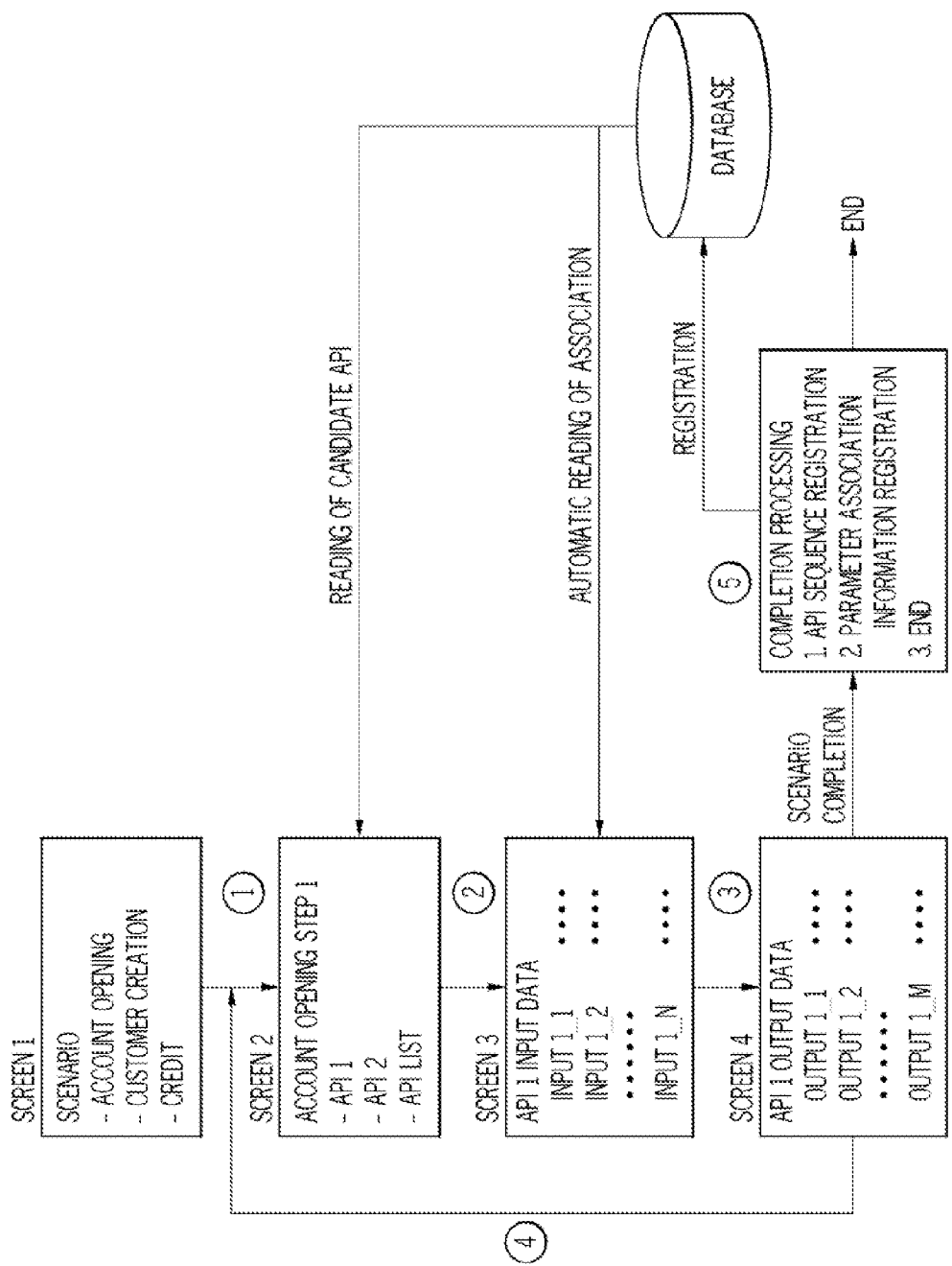
FIG. 14 schematically illustrates the main processing of the testing means according to the preferred embodiment.

FIGS. 4 and 5 are flow charts illustrating main processing of the testing means according to the preferred embodiment of the present invention. FIG. 14 illustrates schematic processing including exemplary screens.

At Step S105, the test tool 10 displays that it accepts a selection of a scenario to be tested. Specifically, registered scenarios are displayed as a list, as shown in Screen 1 of FIG. 14, for example. In this step, registration of a scenario which is tested for the first time may be accepted. By registering the scenario accepted by an input form (not shown), it will appear on the list at the next execution.

At Step S110, the test tool 10 receives a selection of a scenario to be tested from the list of scenarios displayed at Step S105. By receiving this selection, the processing by the test tool 10 proceeds to Step S115.

Step S115 through Step S195 are repeated until all the APIs required for the selected scenario are executed. At Step S115, the test tool 10 reads one or more candidates for an API to be executed in the selected scenario from the test information database 110. Specifically, based on the execution sequence of a plurality of APIs stored at the registration processing upon completion (Step S200), which will be described later, one or more succeeding APIs are inferred from the preceding API and extracted as candidate APIs. The candidate APIs extracted here may increase in number as the test is repeated.

At Step S120, the test tool 10 displays that it accepts a selection of an API to be executed next from the candidate APIs read out at Step S115. Specifically, a list of the candidate APIs is displayed as shown in Screen 2 of FIG. 14, for example. In this screen, a choice for displaying a list of all APIs is provided so that a selection of an API from among APIs other than the candidate APIs can also be made.

At Step S125, the test tool 10 determines whether it has received a selection of displaying the list of all the APIs from the list displayed at Step S120. If the selection of displaying the list of all the APIs has been received, the processing then proceeds to Step S130, or if such selection has not been received, the processing then proceeds to Step S135.

At Step S130, the test tool 10 displays the list of all the APIs to receive a selection of an API to be executed next.

At Step S135, the test tool 10 receives the selection of the API to be executed from the list displayed at Step S120 or Step S130. By receiving this selection, the processing by the test tool 10 proceeds to Step S140.

At Step S140, the test tool 10 reads data representing the associations of the input and output data of the APIs. Specifically, it reads the association data stored at the registration processing upon execution (Step S155) or at the registration processing upon completion (Step S200), both of which will be described later. The association data is stored in a parameter association table 50 of FIG. 12, for example. The parameter association table 50 indicates that the input data specified by an API-ID, a parameter class, and a parameter ID is associated (identical) with the data specified by an associated API-ID, an associated parameter class, and an associated parameter ID.

At Step S145, the test tool 10 displays input data to the API with reference to the execution result of the preceding API, based on the association data read at Step S140. Specifically, it displays a list of input data to the API as shown in Screen 3 of FIG. 14, for example. It may receive input data from the test operator, which cannot be determined based on the association data. The test tool 10 may also receive corrected input for the input data via a branch from Step S170 or Step S190, described later.

At Step S150, the test tool 10 receives a selection of whether or not the registration processing upon execution for the association data is performed. If the selection of performing the registration processing upon execution is received, the processing then proceeds to Step S155, or if such selection is not accepted, the processing then proceeds to Step S160.

Figure 7:
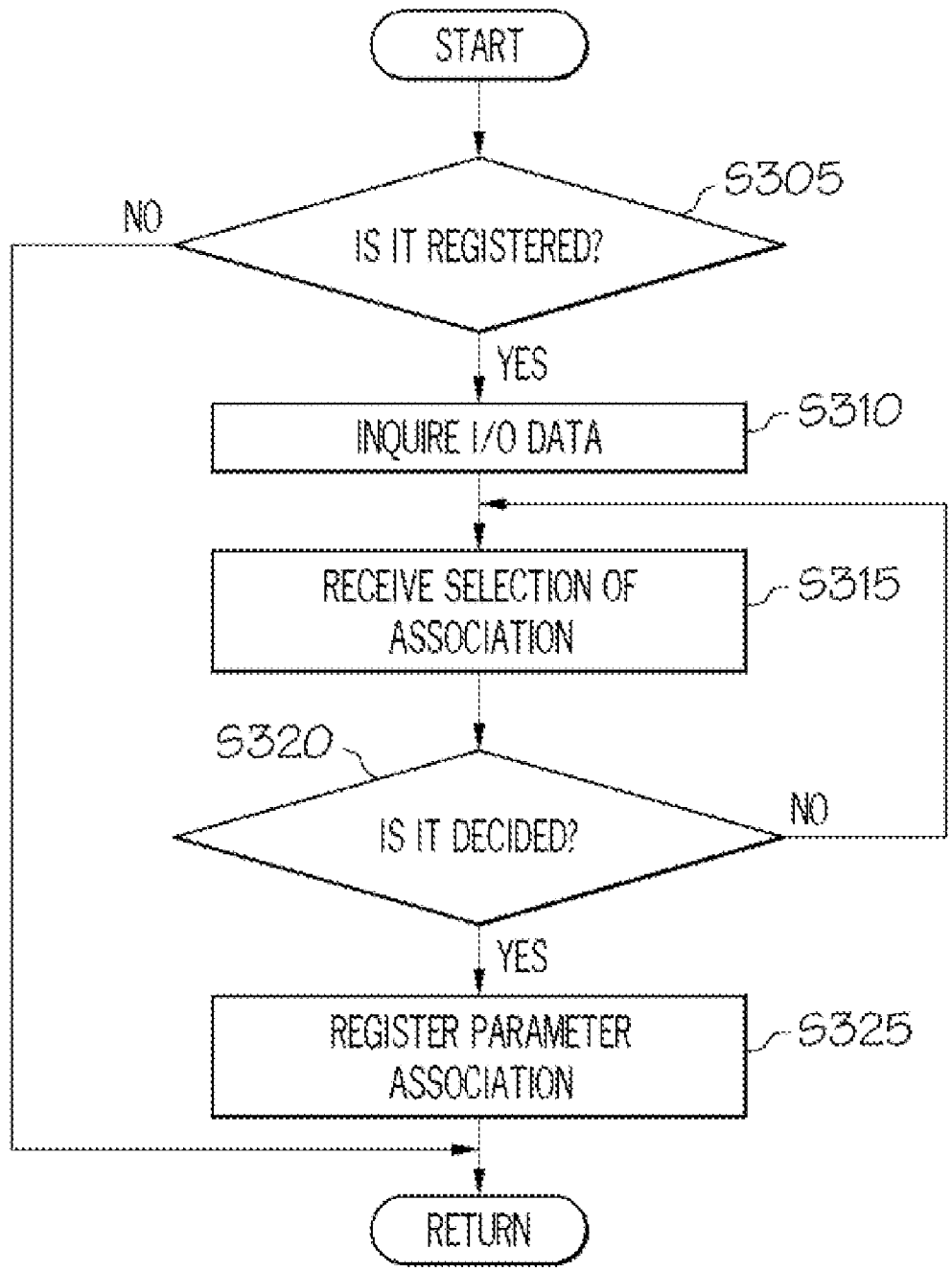
FIG. 7 is a flow chart illustrating registration processing upon execution of the testing means according to the preferred embodiment.

At Step S155, the test tool 10 processes the registration of the association data regarding the input and output data of the APIs. The detail thereof will be described later (FIG. 7).

At Step S160, the test tool 10 determines whether or not the test operator has selected pre-confirmation of a possibility that the execution of the API results in an error due to the set input data. If the selection of pre-confirmation is received, the processing then proceeds to Step S165, or if such selection is not received, the processing then proceeds to Step S170.

Figure 9:
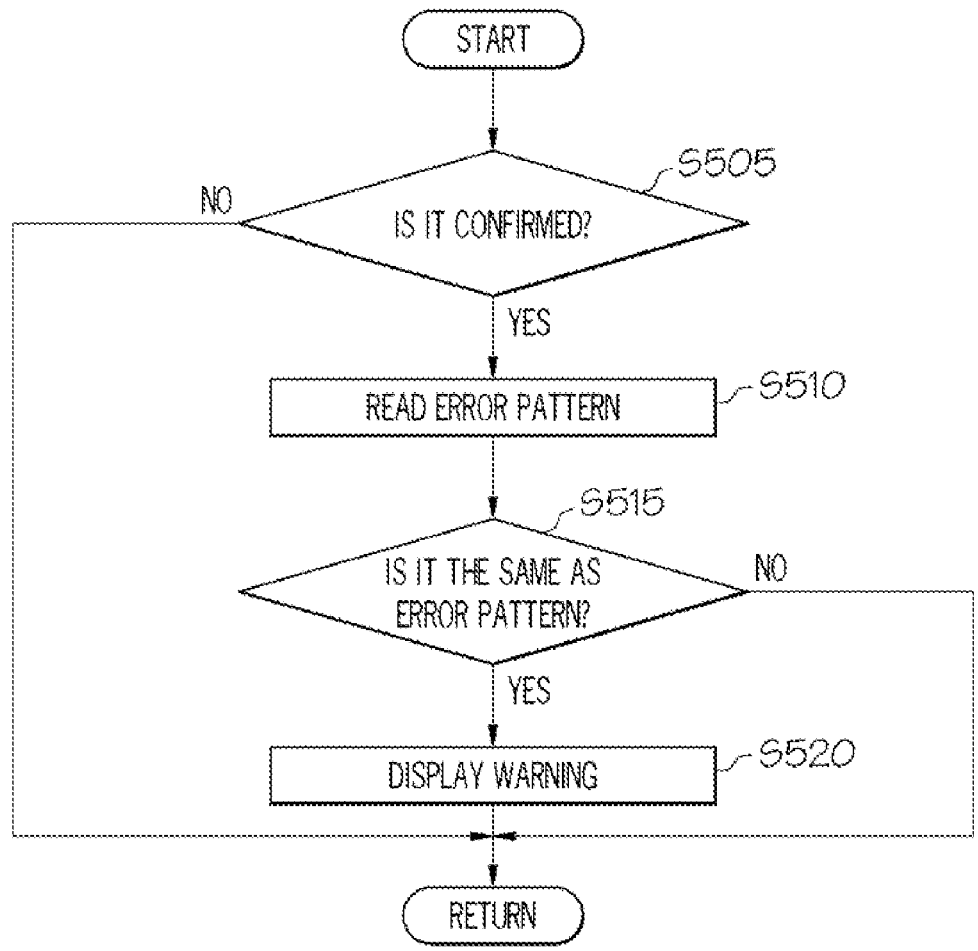
FIG. 9 is a flow chart illustrating error pattern confirmation processing before execution of the testing means according to the preferred embodiment.

At Step S165, the test tool 10 pre-confirms a possibility that the execution of the API results in an error due to the set input data. The detail thereof will be described later (FIG. 9).

At Step S170, the test tool 10 receives input indicating that the API is to be executed. Upon receiving this input, the processing proceeds to Step S175.

At Step S175, the test tool 10 calls and executes the API based on the set input data.

Figure 8:
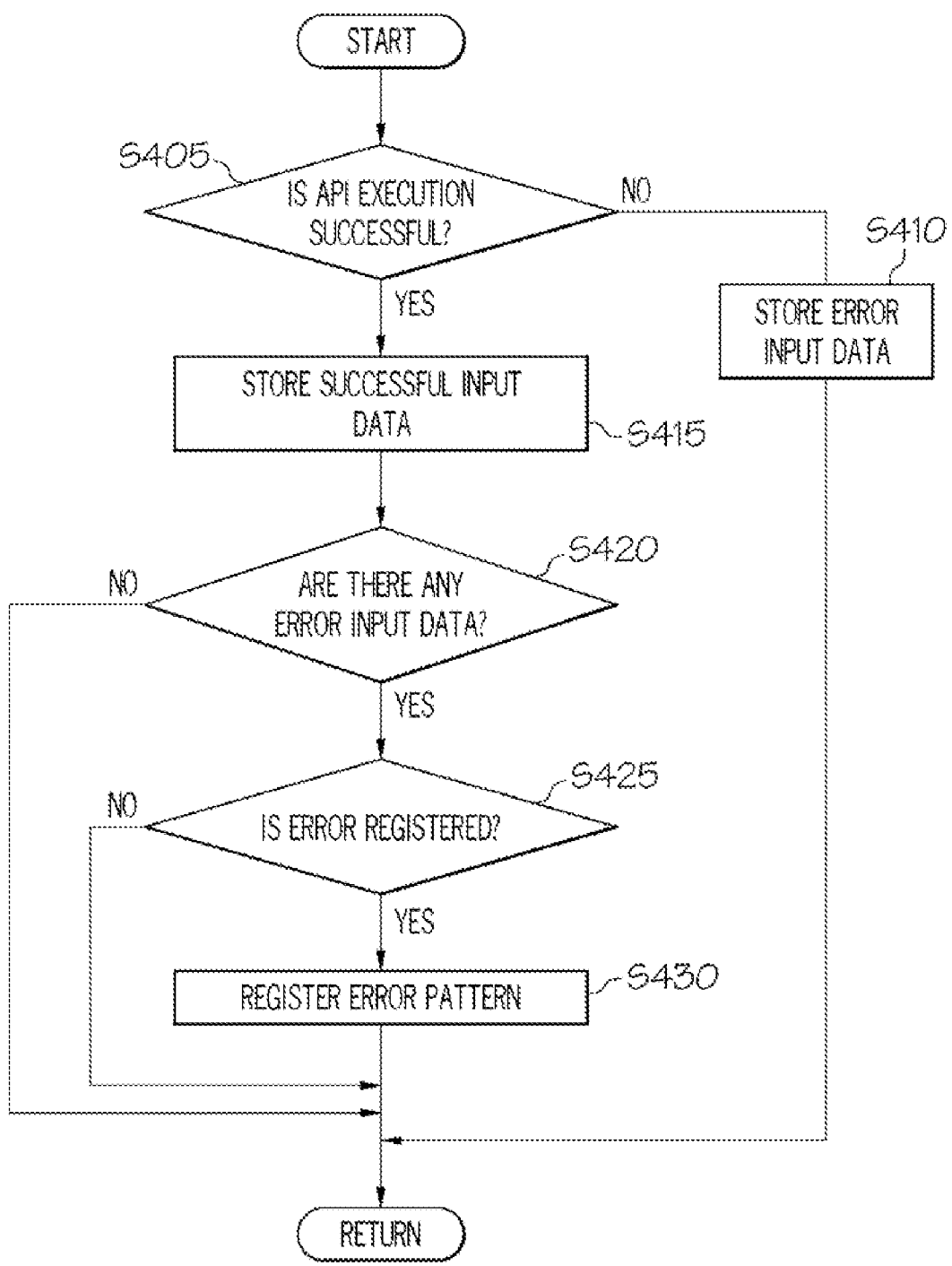
FIG. 8 is a flow chart illustrating error pattern registration processing of the testing means according to the preferred embodiment.

At Step S180, the test tool 10 performs error pattern registration processing based on the result of the execution at Step S175. The detail thereof will be described later (FIG. 8).

At Step S185, the test tool 10 displays output data which is the execution result of the API. Specifically, a list of output data is displayed as shown in Screen 4 of FIG. 14.

At Step S190, the test tool 10 receives a selection of whether to advance the scenario to the next step (execute the next API). If the selection of executing the next API (continuation of the scenario) is received, the processing then proceeds to Step S195, or if the selection of no continuation (re-execution) is received, the processing then returns to Step S145 and the input data is received so as to re-execute the API.

At Step S195, the test tool 10 determines whether or not the scenario is completed. Specifically, it receives a selection of whether or not the scenario terminates, and if the selection of terminating the scenario is received, the processing then proceeds to Step S200, or if the selection of not terminating the scenario (a succeeding API is present) is received, the processing then returns to Step S115 and the selection of the succeeding API is received.

At Step S200, the test tool 10 stores the association data of the input and output data and the data regarding the execution sequence of the APIs. The detail thereof will be described later (FIG. 6).

Figure 6:
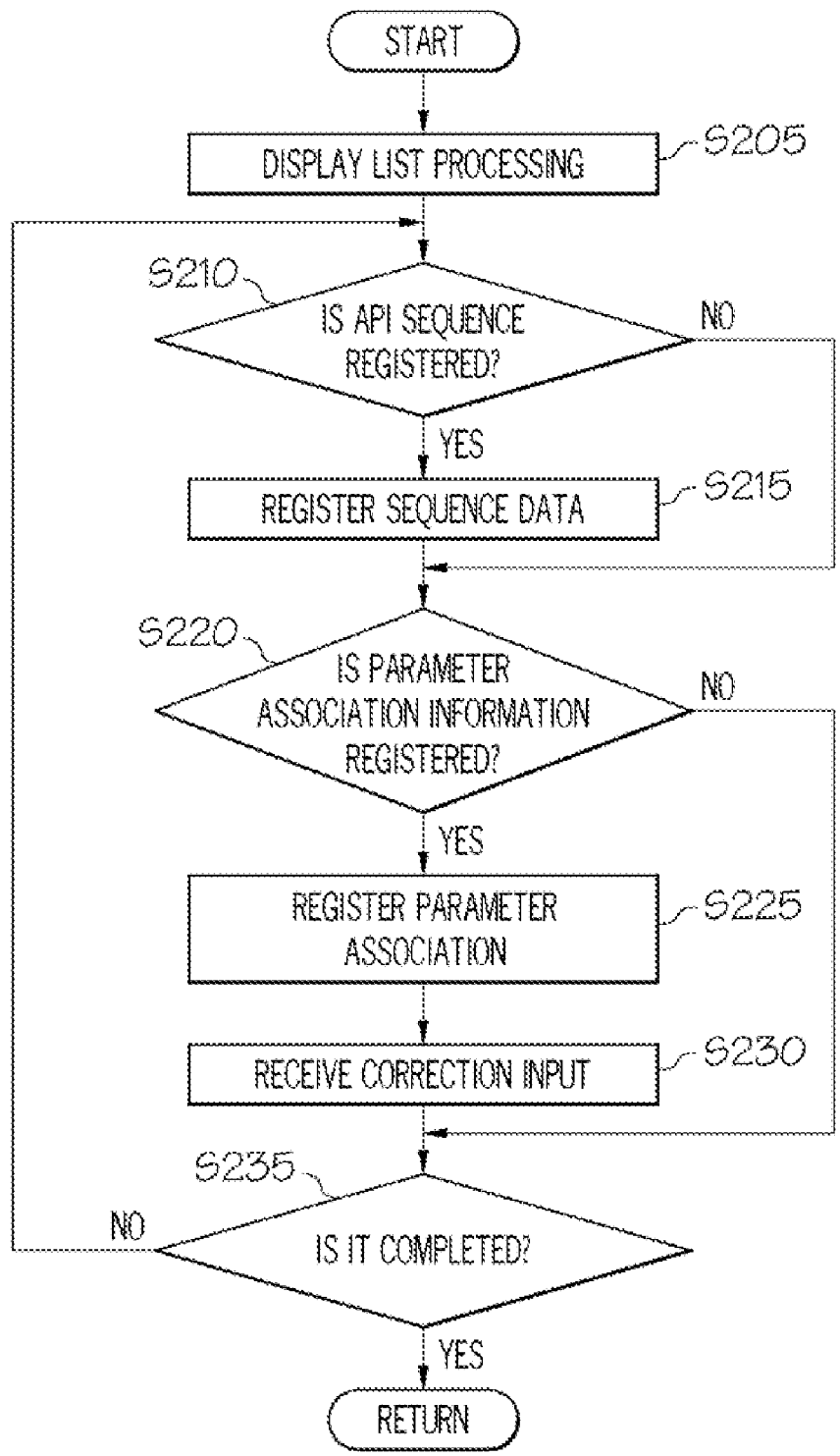
FIG. 6 is a flow chart illustrating registration processing upon completion of the testing means according to the preferred embodiment.

FIG. 6 is a flow chart illustrating the registration processing upon completion of the testing means according to the preferred embodiment of the present invention.

At Step S205, the test tool 10 displays a list of processing to be performed at the time of completion of the scenario and receives a selection of processing to be performed. Specifically, a screen is displayed to receive the selection from among API sequence registration, parameter association information registration, and termination, as shown in Screen 5 of FIG. 14.

At Step S210 and Step S220, the test tool 10 determines whether or not the processing accepted at Step S205 is the API sequence registration or the parameter association information registration. If the accepted processing is the API sequence registration, Step S215 is then performed, or if the accepted processing is the parameter association information registration, Step S225 and Step S230 are then performed.

At Step S215, the test tool 10 stores data regarding the sequence of the APIs which have been executed in the selected scenario. Specifically, scenario, sequence, IDs for identifying the respective APIs, input and output classes of the parameters, parameter IDs, and parameter values are stored in an API registration table 40 of FIG. 11, for example. In this manner, a plurality of APIs used in the scenario along with the I/O data, as well as the execution sequence (order) of the APIs, can be stored. Accordingly, in reading of the candidate APIs described above (Step S115 of FIG. 4), the candidate APIs can be extracted based on this execution sequence.

At Step S225, the test tool 10 stores data representing the association among the input and output data of the plurality of APIs. Specifically, IDs of the APIs, input and output classes of the parameters, parameter IDs, IDs of the associated APIs, input and output classes of the associated parameters, and associated parameter IDs are stored in the parameter association table 50 of FIG. 12, for example. In this manner, it can be expressed that the output data or the input data of a preceding API is identical with the input data of a succeeding API.

Alternatively, the data may be stored as text data, such as "input_2_1=output_1_5"ample, which indicates that the fifth output data of the first API is set as the first input data of the second API.

In order to determine whether or not the parameters are associated with each other, a rule of association is preliminarily set up. The rule may be read as a configuration file. The rule of association may be such that, for example, an association exists if the parameters have the same value or the same data field name. In this case, a default (such as blank for a character string or zero for a numeric value) and an unused field may be excluded.

At Step S230, the test tool 10 receives correction input for the association data stored at Step S225. Specifically, the stored association data is displayed on a separate screen (not shown) so as to receive input for deleting unnecessary association data or adding new association data.

By storing the association data in this manner, the association data is read at the association reading processing described above (Step S140 of FIG. 4) so that the input data for the API to be executed can be automatically displayed.

At Step S235, the test tool 10 determines whether a selection of terminating the registration processing upon completion has been received. If the selection of termination is received, the processing is then terminated, or if it is not received, the processing then returns to Step S210 to wait for input of processing selection.

FIG. 7 is a flow chart illustrating the registration processing upon execution of the testing means according to the preferred embodiment of the present invention.

Figure 15:
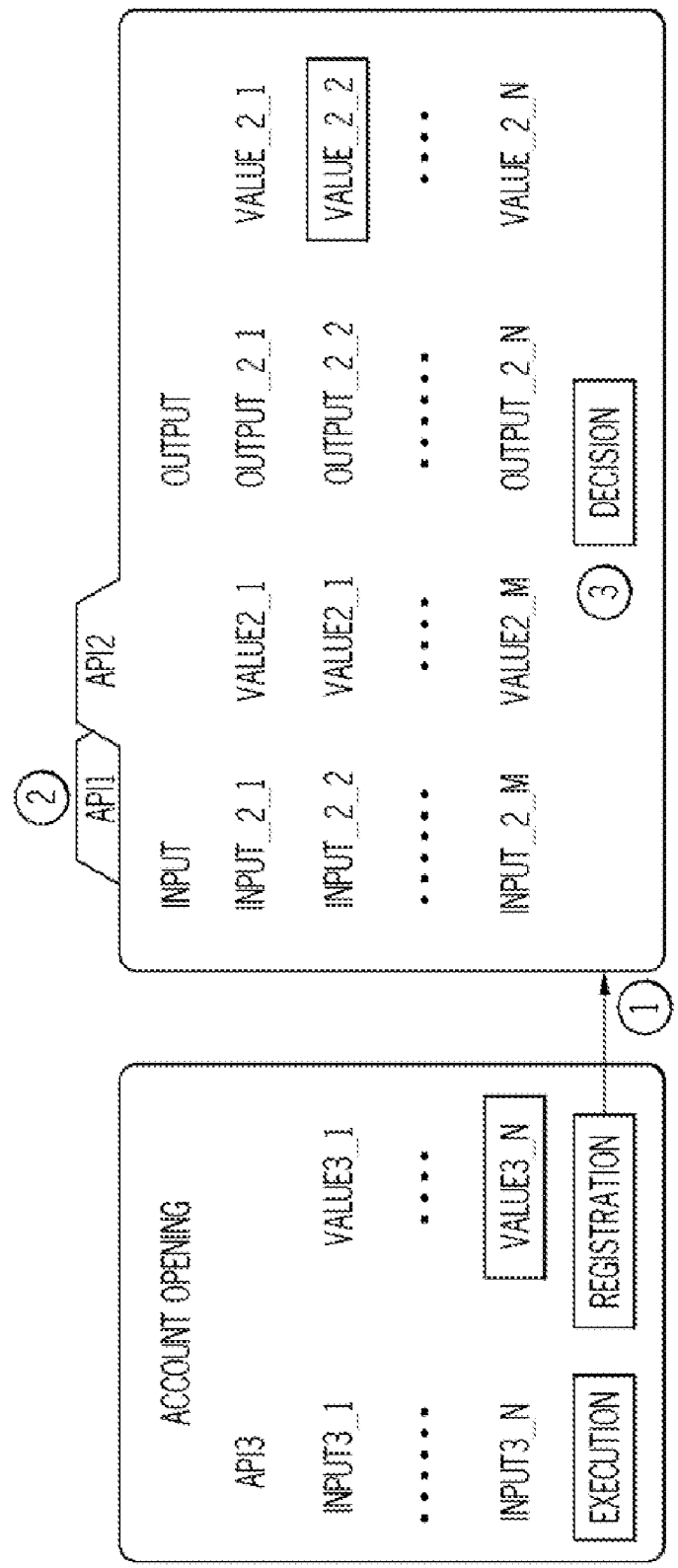
FIG. 15 illustrates a screen example of the registration processing upon execution of the testing means according to the preferred embodiment.

At Step S305, the test tool 10 receives a selection of performing the registration upon execution of the association data. If this selection is received, the processing then proceeds to Step S310. Specifically, according to a screen as shown in FIG. 15, for example, when registering the association of N-th input data Value3_N in API3 of the scenario for the account opening, a selection of the N-th input data is accepted and then input of depressing a registration button is accepted.

At Step S310, the test tool 10 inquires and displays the input and output data of the executed APIs, which have been temporarily stored, in order to receive the input of association. Specifically, a screen, such as shown in FIG. 15, is displayed. The input and output data of each executed API are displayed alternately by switching tabs or the like.

At Step S315, the test tool 10 receives selection input of the association. Specifically, in the case of FIG. 15, for example, in order to associate the N-th input data selected at Step S305 with the second output data of API2 (to set the second output data of API2 as the N-th input data of API3), the selection of Value_2_2 is received.

At Step S320, the test tool 10 receives a selection of deciding the selection of association at Step S315. If the selection of the decision is received, the processing then proceeds to Step S325, or if such selection is not received, the processing continues to receive the selection input of association at Step S315.

At Step S325, the test tool 10 stores the received data representing the association. Specifically, it stores the data in a manner similar to the registration processing upon completion (FIG. 6) described above.

FIG. 8 is a flow chart illustrating the error pattern registration processing of the testing means according to the preferred embodiment of the present invention.

At Step S405, the test tool 10 determines whether or not the execution of the API has been successful (the processing has been completed normally). If the execution has not been successful and has resulted in an error, the processing at Step S410 is then performed, or if it has been successful, the processing at Step S415 is then performed.

At Step S410, the test tool 10 stores the input data inputted into the API which has resulted in the error. Specifically, in the case shown in FIG. 16, for example, it stores that Inputs 1, 2, 3, 4, 5, 6, and 7 had been inputted into Fields 1, 2, 3, 4, 5, 6, and 7, respectively, when the execution has resulted in the error.

Although the error pattern registration processing is terminated at Step S410, the test tool 10 can receive correction input from the test operator to execute the API successfully by repeating Step S145 through Step S190 of the main processing (FIGS. 4 and 5). Thereby, the processing by the test tool 10 proceeds to Step S420 and later.

Figure 16:
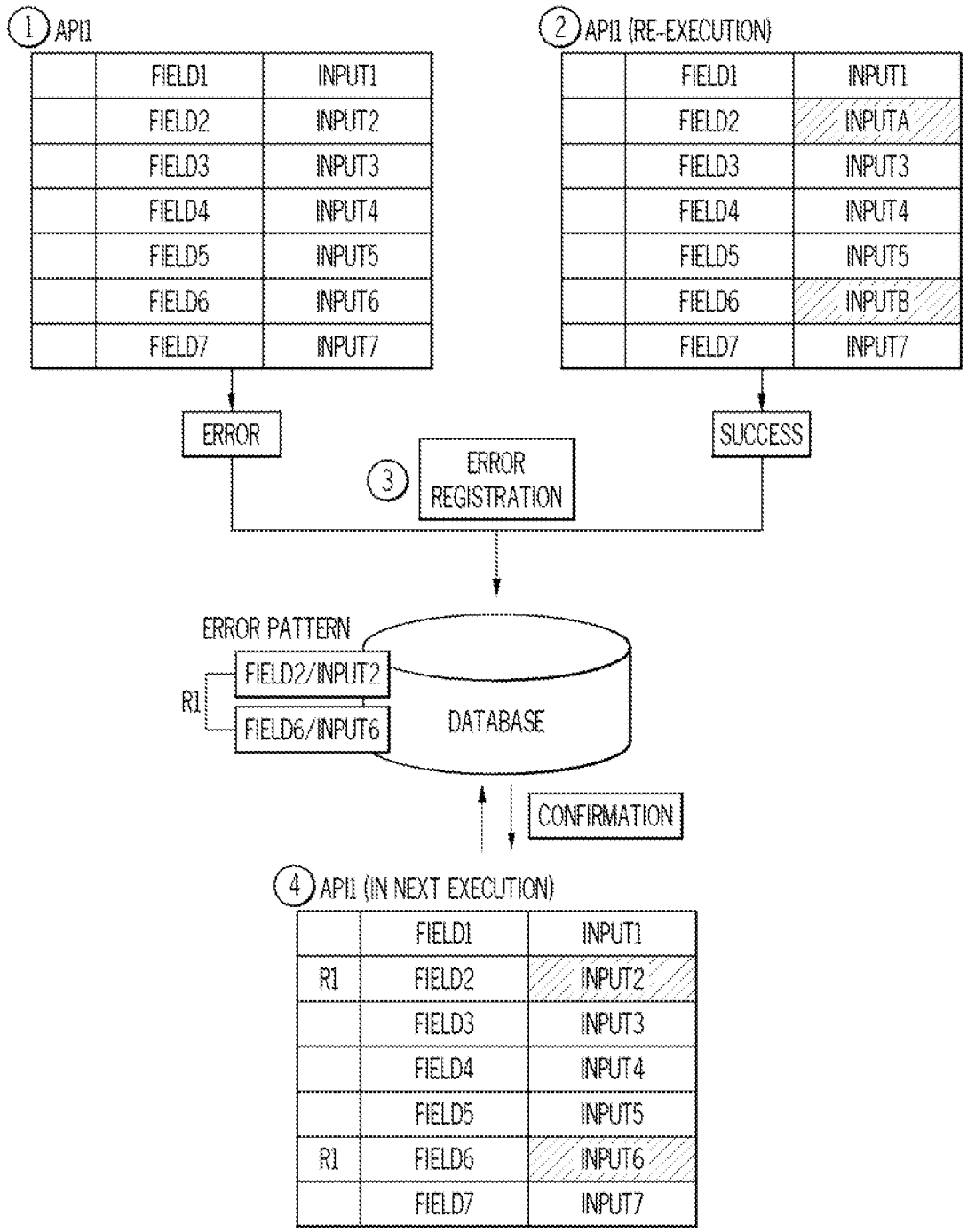
FIG. 16 schematically illustrates the error pattern registration processing and the error pattern confirmation processing before execution of the testing means according to the preferred embodiment.

At Step S415, the test tool 10 stores the input data inputted into the API which has been successfully executed. Specifically, in the case shown in FIG. 16, for example, it stores that Inputs 1, A, 3, 4, 5, B, and 7 had been inputted into Fields 1, 2, 3, 4, 5, 6, and 7, respectively, when the execution has been successful. Although FIG. 16 illustrates a successful example of re-executing the API by the test operator inputting the corrected data after the execution of the same API has resulted in the error, the successful input data may also be stored when the first execution has not resulted in the error.

At Step S420, the test tool 10 determines whether or not the input data which has caused the error is stored at Step S410. If the execution of the API has resulted in the error at least once and the input data at that time is stored, the processing by the test tool 10 proceeds to Step S425.

At Step S425, the test tool 10 receives selection input of whether or not the error pattern is registered If the selection of registration is received, the processing at Step S430 is performed.

At Step S430, the test tool 10 registers the error pattern. Specifically, the input data caused the error, which is stored at Step S410, is compared with the successful input data stored at Step S415. Thereafter, a part of the input data caused the error, which is different from the successful input data, is stored as the error pattern in the error pattern table 60 of FIG. 13. For example, in the case shown in FIG. 16, the values of Field 2 and Field 6 of the input data caused the error are different from those of the successful input data. From this, it is considered that the error is caused by the value of Field 2 being Input 2 and the value of Field 6 being Input 6, and these are stored as the error pattern.

The error pattern table 60 stores IDs for identifying the APIs, IDs for identifying the error patterns, input data (parameter) IDs, and input data. Note herein that, the error pattern is not limited to single input data, but may be a set of multiple input data (in the ease of FIG. 16, a set of Field 2 and Field 6). In the case of a set of multiple input data, the error pattern is tagged with a plurality of input data IDs (RS in the case of FIG. 16) and the error pattern ID represents the association therebetween.

FIG. 9 is a flow chart illustrating error pattern confirmation processing before execution of the testing means according to the preferred embodiment of the present, invention.

At Step S505, the test tool 10 receives a selection input of whether or not a possibility of causing an error is confirmed before executing the API. If the selection of confirmation is received, the processing then proceeds to Step S510.

At Step S510, the test tool 10 reads the error pattern data stored at the error pattern registration processing described above. Specifically, it acquires a pattern, input parameter IDs, and parameter values corresponding to the ID of the API to be confirmed from the error pattern table 60.

At Step S515, the test tool 10 compares the input data to be confirmed with the parameter values read at Step S510 to determine whether or not they are identical with each other. If they are identical, the processing then proceeds to Step S520, or if they are not identical, the processing is then terminated.

At Step S520, the test tool 10 displays a warning that the error is possibly caused if the API is executed with the specified input data.

As for the error pattern confirmation processing before execution described above, FIG. 16 illustrates an example thereof. Comparing the input data caused the error with the successful input data in executing the API1, it is seen that the second input data and the sixth input data are different in both sets of data. This difference data is stored as an error pattern R1 (indicating that an error is caused if the second input data is Input2 and the sixth input data is Input6). When the error pattern confirmation processing before execution is performed at the next execution time, the second input data and the sixth input data are identical with those stored as the error pattern RL so that the warning is displayed by highlighting the relevant input data with a different color, for example.

In order to indicate that a combination of the second input data and the sixth input data causes an error, the error pattern ID representing the association (R1 in the example of FIG. 16) is also displayed.

By providing the functions described above, the test tool 10 accumulates sequence data, association data, and error pattern data in the test information database 110 as the test proceeds. In other words, by repeating the test, the amount of information in the test information database 110 (sequence data, association data, and error pattern data) increases and grows.

Thereby, an indication which serves as a guidance regarding selections of APIs and input data (displaying of the candidate APIs or automatic displaying of the input data) can be provided for the test operator. Accordingly, it may reduce the testing time or the amount of preliminary working load for studying specifications or the like required for the test operator upon performing the test. Moreover, since the possibility of input, mistakes can be reduced, it can also contribute to improvement in quality.

Figure 10:
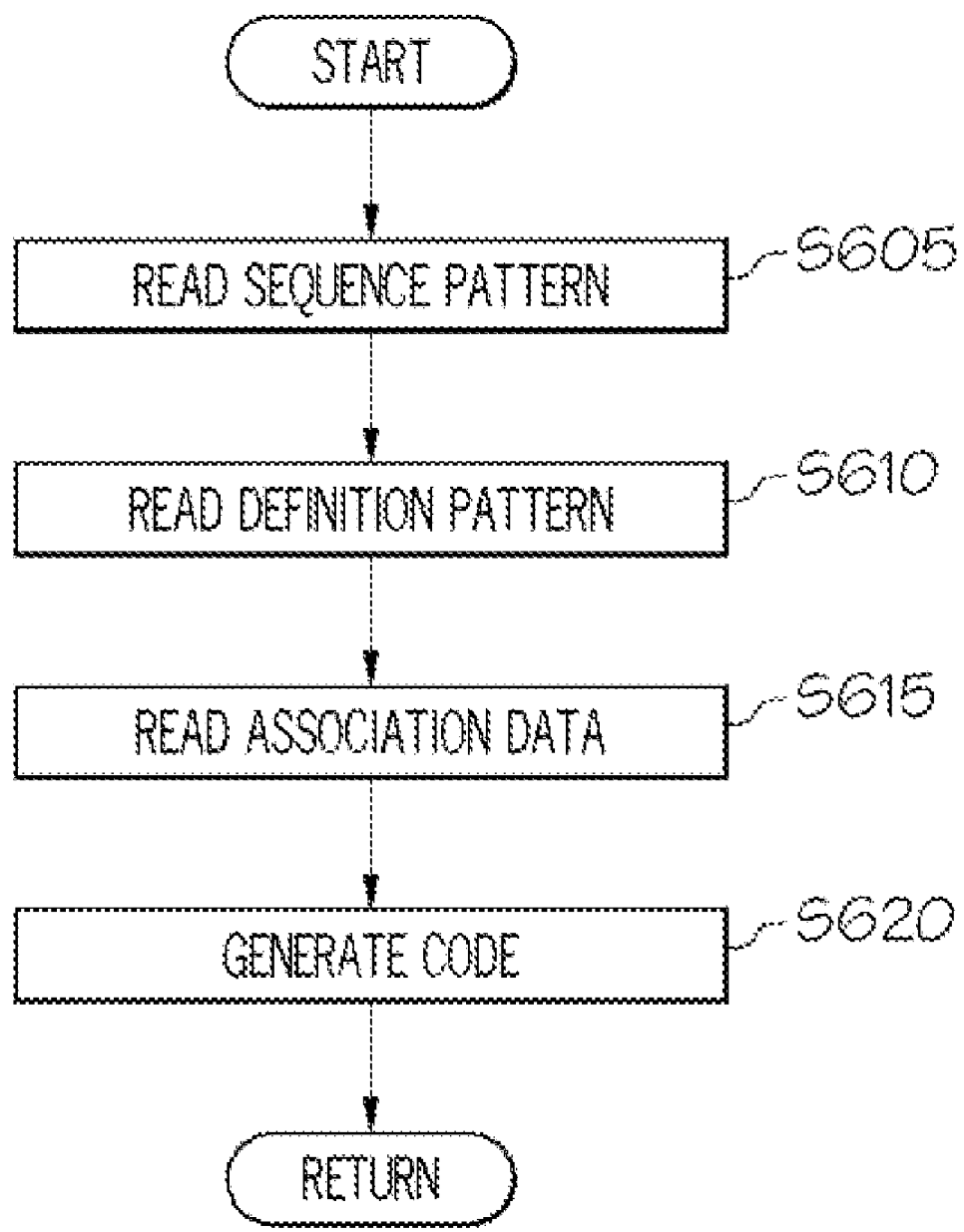
FIG. 10 is a flow chart illustrating code generation processing of the testing means according to the preferred embodiment.

Based on the data stored by the various processing described above, the test tool 10 can generate a source code of a sample which is usable in the actual application. FIG. 10 is a flow chart illustrating the code generation processing of the testing means according to the preferred embodiment of the present invention.

At Step S605, the test tool 10 reads the sequence data of the APIs stored at the registration processing upon completion described above. Thereby, all the APIs executed in the specified scenario are extracted.

At Step S610, the test tool 10 reads API definition data (data regarding a call format of the APIs extracted from the API definition file read by the API parsing unit 130 of FIG. 3). Thereby, the call format (such as a type of I/O data and a description method) of the APIs extracted at Step S605 can be comprehended and described.

At Step S615, the test tool 10 reads the association data regarding the I/O data stored at the registration processing upon completion or the registration processing upon execution, described above.

At Step S620, the test tool 10 generates the source code used as the sample of the application based on the sequence data, the API definition data, and the association data, FIG. 17 illustrates a specific example of the source code.

The first API (getInformation) requires 15 pieces of input data, while the second API (create) requires six pieces of input data.

The first output data, the third input data, and the twentieth output data of the first API (getInformation), correspond to the first input data, the third input data, and the fifth input data of the second API (create), respectively.

Therefore, the source code describes the execution of "getInformation" by specifying 15 pieces of input data, followed by the execution of "create" by specifying six pieces of input data.

Here, specified as the first input data of "create" is the first output data of "output1" which is the execution result of "getInformation". In addition, specified as the third input data is the third input data of "getInformation". Similarly, specified as the fifth input data is the twentieth output data of "output1".

By generating the source code of the sample in this manner, it may increase efficiency of coding in developing the application, as well as quality of the application by reducing the possibility of description mistakes.

While various embodiments of the present invention have been described, the present invention is not thereto limited.

What is claimed is:

1. A method of presenting a scenario candidate that sequentially executes a plurality of application program interfaces (APIs), comprising the steps of:
   displaying a list of APIs each of which is a candidate to be executed next;
   receiving a selected API to be executed next from the list of APIs;
   receiving an input data associated with the selected API;
   executing the selected API, wherein an output data generated from the execution of the selected API is input into one or more subsequently executed APIs;
   storing sequence data indicating an execution sequence of the plurality of executed APIs;
   identifying a first input data input into one or more subsequently executed APIs that resulted in an execution error;
   identifying a second input data input into one or more subsequently executed APIs that did not result in the execution error;
   comparing the first input data to the second input data to determine one or more combinations of input data that results in one or more execution errors;
   storing association data indicating the presence of the one or more combinations of input data resulting in the one or more execution errors between the plurality of executed APIs, wherein:
   on the occasion that the list of APIs are sequentially selected and a new scenario is tested;
   in the step of displaying the list of APIs each of which is a candidate to be executed next, if the sequence data regarding the selected API has already been stored, a candidate API to be executed next is displayed based upon the sequence data; and
   in the step of receiving the input data associated with the selected API, if the sequence data regarding the selected API has already been stored, the input data is displayed based upon the association data;
   registering the one or more combinations of input data that resulted in the one or more execution errors; and
   determining whether there has been a pre-confirmation that execution of the selected API results in the one or more execution errors.

* * * * *